United States Patent
Wang et al.

(10) Patent No.: US 12,525,818 B2
(45) Date of Patent: Jan. 13, 2026

(54) METHOD OF OPERATING AN INTERNET-OF-THINGS DEVICE AND ENERGY HARVESTING SIGNAL

(71) Applicant: Rohde & Schwarz GmbH & Co. KG, Munich (DE)

(72) Inventors: Lilei Wang, Munich (DE); Daniela Raddino, Munich (DE); Rania Morsi, Munich (DE); Yashwanth Ramesh, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 13 days.

(21) Appl. No.: 18/673,838

(22) Filed: May 24, 2024

(65) Prior Publication Data

US 2024/0396370 A1    Nov. 28, 2024

Related U.S. Application Data

(63) Continuation-in-part of application No. 18/323,269, filed on May 24, 2023, now Pat. No. 12,206,249.

(51) Int. Cl.
*H02J 50/00* (2016.01)
*G16Y 10/35* (2020.01)
*G16Y 40/35* (2020.01)

(52) U.S. Cl.
CPC ............ *H02J 50/001* (2020.01); *G16Y 10/35* (2020.01); *G16Y 40/35* (2020.01)

(58) Field of Classification Search
CPC ...... H02J 50/001; H02J 50/061; G16Y 10/35; G16Y 40/35
USPC ........................................................ 307/104
See application file for complete search history.

(56) References Cited

U.S. PATENT DOCUMENTS

| | | |
|---|---|---|
| 2015/0363614 A1 | 12/2015 | Yeager et al. |
| 2023/0031981 A1 | 2/2023 | Yehezkely et al. |

FOREIGN PATENT DOCUMENTS

| | | |
|---|---|---|
| WO | 2022/131984 A1 | 6/2022 |
| WO | 2023/287346 A2 | 1/2023 |

*Primary Examiner* — Hal Kaplan
(74) *Attorney, Agent, or Firm* — CHRISTENSEN O'CONNOR JOHNSON KINDNESS PLLC

(57) ABSTRACT

Embodiments of the present disclosure provide a method of operating an internet-of-things (IoT) device. An internet-of-things device with an energy storage is provided. An energy harvesting signal is transmitted over-the-air. The energy harvesting signal provides energy to be stored in the energy storage. The energy harvesting signal is transmitted prior to a synchronization signal which synchronizes the internet-of-things device.

20 Claims, 2 Drawing Sheets

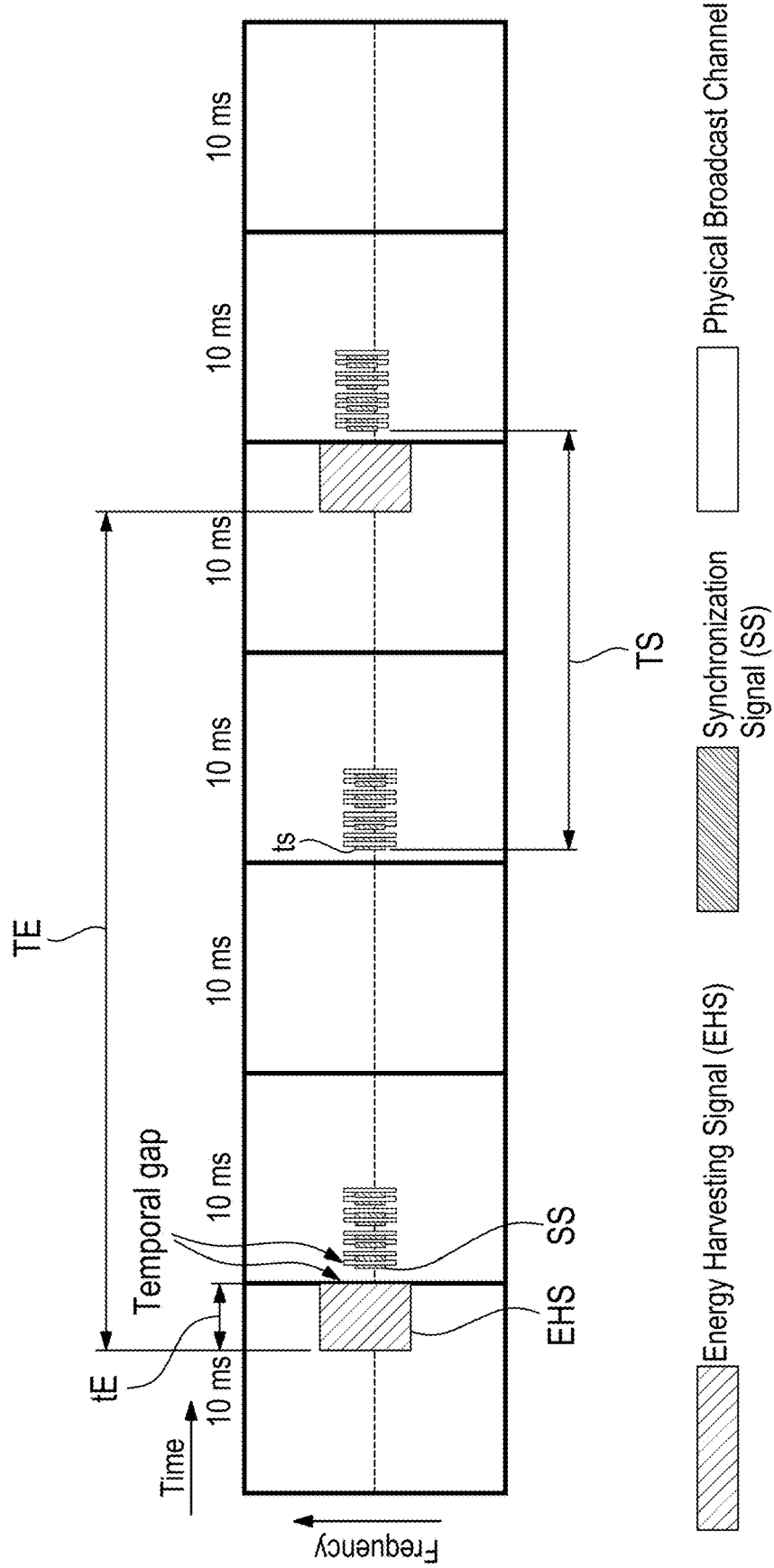

METHOD OF OPERATING AN INTERNET-OF-THINGS DEVICE AND ENERGY HARVESTING SIGNAL

CROSS REFERENCE TO RELATED APPLICATION

This application is a continuation-in-part of U.S. application Ser. No. 18/323,269, filed May 24, 2023, the entire disclosure of which is hereby incorporated by reference.

FIELD OF THE DISCLOSURE

Embodiments of the present disclosure relate to a method of operating an internet-of-things, IoT, device. Further, embodiments of the present disclosure relate to an energy harvesting signal to be used by a method of operating an IoT device.

BACKGROUND

In modern telecommunication standards like 5G-A/6G, so-called Zero-Power internet-of-things, ZP-IoT, devices are suggested that do not require a steady energy source for operation, which might have to be replaced after some time. In other words, those devices may be battery-less and cordless.

Accordingly, the Zero-Power internet-of-things devices shall obtain the necessary energy required for operations from other nearby devices that may communicate with the respective IoT devices, for instance by using Bluetooth or Wi-Fi. Specifically, the respective Zero-Power internet-of-things devices shall receive energy from the other nearby device, namely by signals that are radiated by the other nearby device and received by the respective IoT devices.

Once a signal is radiated and received by the IoT device, the IoT device will convert the signal received in order to store energy that can be used internally by the IoT device at least for certain operations, for instance communication purposes.

However, it has been identified that the efficiency of the Zero-Power internet-of-things devices has to be increased in order to ensure proper operation of the respective device.

The IoT devices need energy to synchronize with a synchronization signal block, SSB, and access a cell via a random access procedure to be enabled to receive the signal from the other nearby device. However, an IoT device in its idle mode may not have enough energy to do that, particularly to perform the synchronization and/or to perform an initial access to a cell.

In addition, the synchronization signal is transmitted periodically which results in wasting energy of the IoT device if the IoT device always tries to synchronize during the SSB.

Accordingly, there is a need for a method of operating an IoT device that ensures efficient handling and operation.

SUMMARY

The following summary of the present disclosure is intended to introduce different concepts in a simplified form that are described in further detail in the detailed description provided below. This summary is neither intended to denote essential features of the present disclosure nor shall this summary be used as an aid in determining the scope of the claimed subject matter.

Embodiments of the present disclosure provide a method of operating an internet-of-things, IoT, device. In an embodiment, the method comprises providing an IoT device with an energy storage; and transmitting an energy harvesting signal over-the-air (OTA). The energy harvesting signal provides energy to be stored in the energy storage. The energy harvesting signal is transmitted prior to a synchronization signal which synchronizes the IoT device, for example with a network device.

The main idea is to transmit the energy harvesting signal prior to the synchronization signal such that the energy is forwarded to the IoT device prior to the synchronization. Accordingly, it can be ensured that the IoT device has enough energy to perform the synchronization, namely enough energy to receive and process the synchronization signal. Generally, the energy harvesting signal may be optimized with respect to its purpose, namely the energy harvesting functionality, thereby inter alia ensuring that the signal strength is high enough so as to comply with the relatively high requirement on power sensitivity of the IoT device, e.g. −20 dBm.

In contrast thereto, a signal strength of the synchronization signal used, e.g. by the synchronization signal block, is lower. Accordingly, the signal strength of the synchronization signal may not be able to charge the IoT device sufficiently since a power received from the synchronization signal is expected to be lower than −20 dBm. Hence, the synchronization signal itself cannot be used for providing the required energy.

It is also not an option to enhance the synchronization signal block, SSB, e.g. increase the signal strength of the synchronization signal so as to provide enough energy, as this may impact IoT devices established as legacy devices.

Accordingly, the energy harvesting signal is a separate signal compared to the synchronization signal. In an embodiment, it has different characteristics compared to the synchronization signal or any other cellular reference signal.

An aspect provides that a temporal gap, for example, is provided between the energy harvesting signal and the synchronization signal, namely their respective transmission times. Thus, the energy harvesting signal and the synchronization signal do not directly follow each other, as the temporal gap is provided between these signals, e.g. their respective transmission times. The temporal gap ensures activation of internal circuits of the IoT device for being enabled to perform the synchronization appropriately. For instance, an internal reception circuit (and optionally an internal transmission circuit) of the IoT device is activated during the temporal gap based on the energy received by the energy harvesting signal.

Therefore, the energy harvesting signal may relate to a wake-up signal for the internal circuit(s) of the IoT device so as to enable the IoT device to perform the synchronization, for example an initial synchronization. Put differently, the energy harvesting signal may wake up the IoT device and provide the necessary energy for performing subsequent processes like the synchronization.

Hence, it is not necessary that the IoT device has a clock that is capable of synchronizing the IoT device to an energy harvest window in order to ensure that the IoT device wakes up for receiving the energy harvesting signal.

In an embodiment, the synchronization signal may be attached to the energy harvesting signal such that the synchronization signal follows the energy harvesting signal in a defined manner. This ensures that the IoT device is able to quickly access the cell after energy harvesting has been done. The energy provided by the energy harvesting signal is used during the subsequent synchronization in order to enable the IoT device to receive and process the synchronization signal accordingly. In other words, the energy transferred by the energy harvesting signal is not wasted for other purposes, as it is used for the synchronization.

In an embodiment, there may be a linkage between the energy harvesting signal and the synchronization signal in time domain.

In an embodiment, the energy harvesting signal may be repeated with a periodicity larger than a periodicity of the synchronization signal. Both signals are periodically transmitted. Generally, the IoT device has a relaxed requirement on latency such that the respective periodicity of the energy harvesting signal can be larger. This saves energy of the network, thereby increasing the overall efficiency.

For instance, the periodicity of the energy harvesting signal may be at least twice the periodicity of the synchronization signal. It has been identified that his specific relationship provides promising results with regard to overall efficiency of the system.

For instance, the periodicity of the energy harvesting signal is 40 ms, whereas the periodicity of the synchronization signal is 20 ms or lower. In an embodiment, the periodicity is associated with the SSB during which the synchronization signal is transmitted as well as a block during which the energy harvesting signal is transmitted.

In an embodiment, the energy harvesting signal may be transmitted for a duration that ensures charging the IoT device enough for at least enabling synchronization and/or accessing a cell via a random access procedure. Therefore, the energy transferred by means of the energy harvesting signal is sufficient for the IoT device to perform the subsequent processes, namely synchronization and/or accessing the cell via a random access procedure.

In an embodiment, the energy harvesting signal may be transmitted with maximum power. This ensures that the IoT device can be charged accordingly. In an embodiment, the transmission of the energy harvesting signal with maximum power also ensures that the duration of the energy harvesting signal may be reduced to a minimum.

In general, the power of the energy harvesting signal may be higher than synchronization signal block, SSB, or normal physical channel.

In an embodiment, the IoT device may be in an idle mode when receiving the energy harvesting signal. As mentioned above, the energy harvesting signal may relate to a wake-up signal for the IoT device, for example the internal circuit(s). The energy harvesting signal provides energy to the IoT device and wakes up the respective circuit(s) necessary for performing the subsequent processes, e.g. synchronization and/or initial access of a cell.

Embodiments of the present disclosure further provide an energy harvesting signal to be used by the method of operating an IoT device as described above. In an embodiment, the energy harvesting signal has energy harvesting signal characteristics optimized for energy harvesting. The energy harvesting signal characteristics comprise at least one of sequence, bandwidth and resource element, RE, mapping. Accordingly, the energy harvesting signal may be optimized for the respective purpose, namely forwarding energy to the IoT device. The energy harvesting signal characteristics like sequence, bandwidth and/or resource element mapping may be adapted appropriately in order to ensure that the IoT device receiving the energy harvesting signal is enabled to receive the energy in an efficient and optimized manner.

For instance, the energy harvesting signal could occupy the whole (system) bandwidth to achieve high efficiency of energy conversing. In contrast thereto, synchronization signal block, SSB, signals or other cellular reference signals, e.g. Channel State Information Reference Signals, CSI-RS, only occupy part of the (system) bandwidth.

In an embodiment, the sequence of the energy harvesting signal however may be different, e.g. from a continuous wave, CW, to a more complex m-sequence, also called maximum length sequence, MLS.

In an embodiment, the resource element, RE, mapping may be associated with duration and periodicity. Actually, the duration and/or periodicity of the energy harvesting signal might be larger than a synchronization signal block, SSB, signal or other signals, thereby enabling the burst of energy transmission.

For instance, the energy harvesting signal may be larger than four (successive) Orthogonal Frequency-Division Multiplexing, OFDM, symbols.

In an embodiment, the energy harvesting signal may have a duration that ensures charging the IoT device enough for at least enabling synchronization and/or accessing a cell via random access procedure. Besides the duration, the respective power of the energy harvesting signal is also a parameter to be taken into account in order to ensure charging the IoT device sufficiently. However, the maximum power is limited and thus, the duration is selected to ensure that the IoT device receives enough energy for the subsequent procedures, namely the synchronization and/or accessing the cell.

For instance, the duration of the energy harvesting signal is between 1 ms and 5 ms. It has been found that this duration is sufficient to provide enough energy for the IoT device for the subsequent tasks like synchronization and/or accessing the cell.

Another aspect provides that the energy harvesting signal has different characteristics compared to a synchronization signal used for synchronizing the IoT device, e.g. with a network device. Hence, the energy harvesting signal is a different signal compared to the synchronization signal. The respective characteristics of the energy harvesting signal also differ from the ones of the synchronization signal.

In an embodiment, the energy harvesting signal may have a periodicity larger than a synchronization signal used for synchronizing the IoT device, e.g. with a network device. Thus, energy of the network to which the IoT device is connected can be saved, thereby increasing the overall efficiency of the system.

In an embodiment, the energy harvesting signal may have a larger bandwidth than the synchronization signal used for synchronizing the IoT device, e.g. with a network device. As mentioned above, the energy harvesting signal is a separate signal that is used for only providing energy to the IoT device.

In an embodiment, the energy harvesting signal may have a larger duration than the synchronization signal used for synchronizing the IoT device, e.g. with a network device. Thus, the energy harvesting signal is enabled to forward sufficient energy the IoT device.

Hence, the bandwidth and the duration are different for the energy harvesting signal and the synchronization signal.

Moreover, the sequence as well as the resource element mapping may also be different for the energy harvesting signal compared to the synchronization signal.

In an embodiment, no data multiplexing in frequency domain and/or spatial domain is provided, as the energy harvesting signal occupies all power in a OFDM symbol. Consequently, the transmission of the required energy can be optimized.

In an embodiment, the energy harvesting signal may comprise at least one synchronization signal component. In an embodiment, the energy harvesting signal may also be used for synchronizing the IoT device appropriately. In other words, the energy harvesting signal can be leveraged to do synchronization.

Generally, the IoT device may be a ZP-IoT device, an ambient IoT device or any other kind of IoT device.

In an embodiment, the IoT device however is in its idle mode when the IoT device receives the energy harvesting signal. Hence, the IoT device is charged prior to the synchronization signal block, SSB.

In general, the energy harvesting signal, EHS, is a special radio frequency signal that is designed for optimizing the radio frequency, RF, energy transfer to the reception device, e.g. the IoT device.

In an embodiment, the energy harvesting signal, EHS, may be embedded in a 5G New Radio, NR, Orthogonal Frequency-Division Multiplexing, OFDM, system.

In an embodiment, the symbols of the energy harvesting signal, EHS, namely the EHS symbols, may have a different subcarrier spacing and/or a different duration than SSB OFDM symbols.

In other words, it does not necessary be 30 kHz, 60 kHz or 120 kHz as inter alia used in the 5G NR OFDM system for the SSB signals.

Moreover, the sequence of the energy harvesting signal, EHS, can be transmitted four times, for example, within one OFDM symbol, e.g. symbol length of 67 μs.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
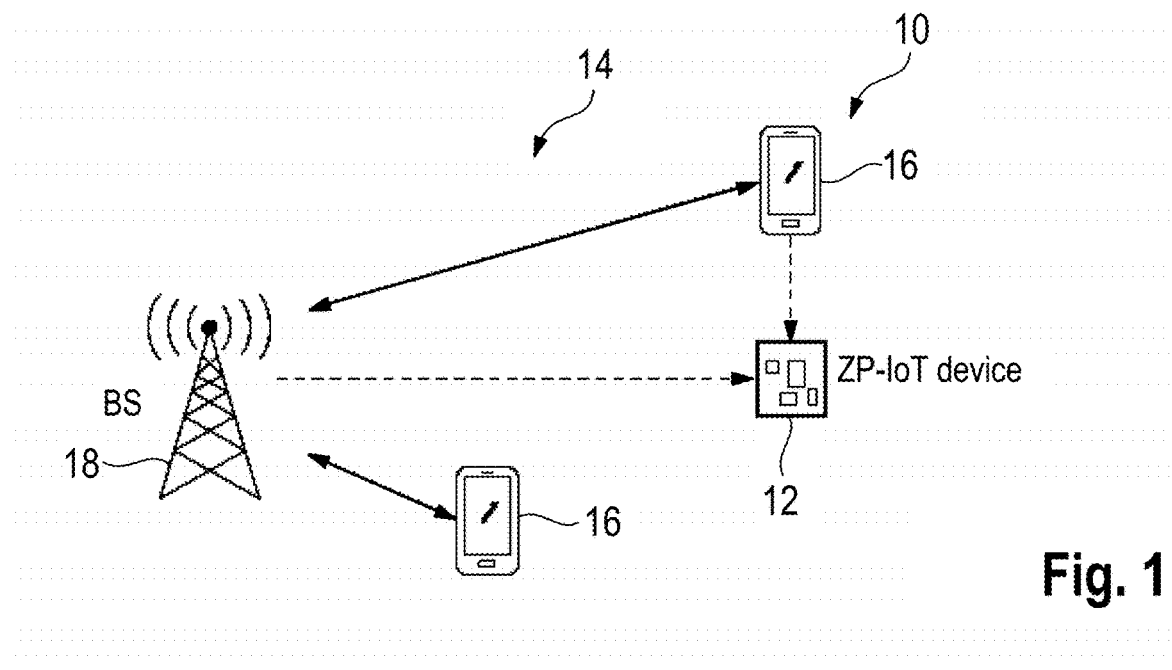
FIG. 1 schematically shows an overview of example system comprising an internet-of-things, IoT, device that is operated by a method of operating the IoT device according to an embodiment of the present disclosure, FIG. 2 schematically shows a schematic overview of an example of an IoT device used in the system of FIG. 1, FIG. 3 schematically shows an overview illustrating a method of operating an IoT device according to an embodiment of the present disclosure.

In FIG. 1, a system 10 for operating an internet-of things (IoT) device 12 is shown, wherein the IoT device 12 is illustrated as a zero power internet-of-things device (ZP-IoT) device. Generally, the IoT device 12 may also be an ambient IoT device or any other kind of IoT device.

As shown in FIG. 1, the system 10 also comprises a network 14, further IoT devices 16 as well as a network device 18, e.g. a base station. The network device 18, namely the base station, may establish a network 14 for the IoT device 12 and the further IoT devices 16.

Figure 2:
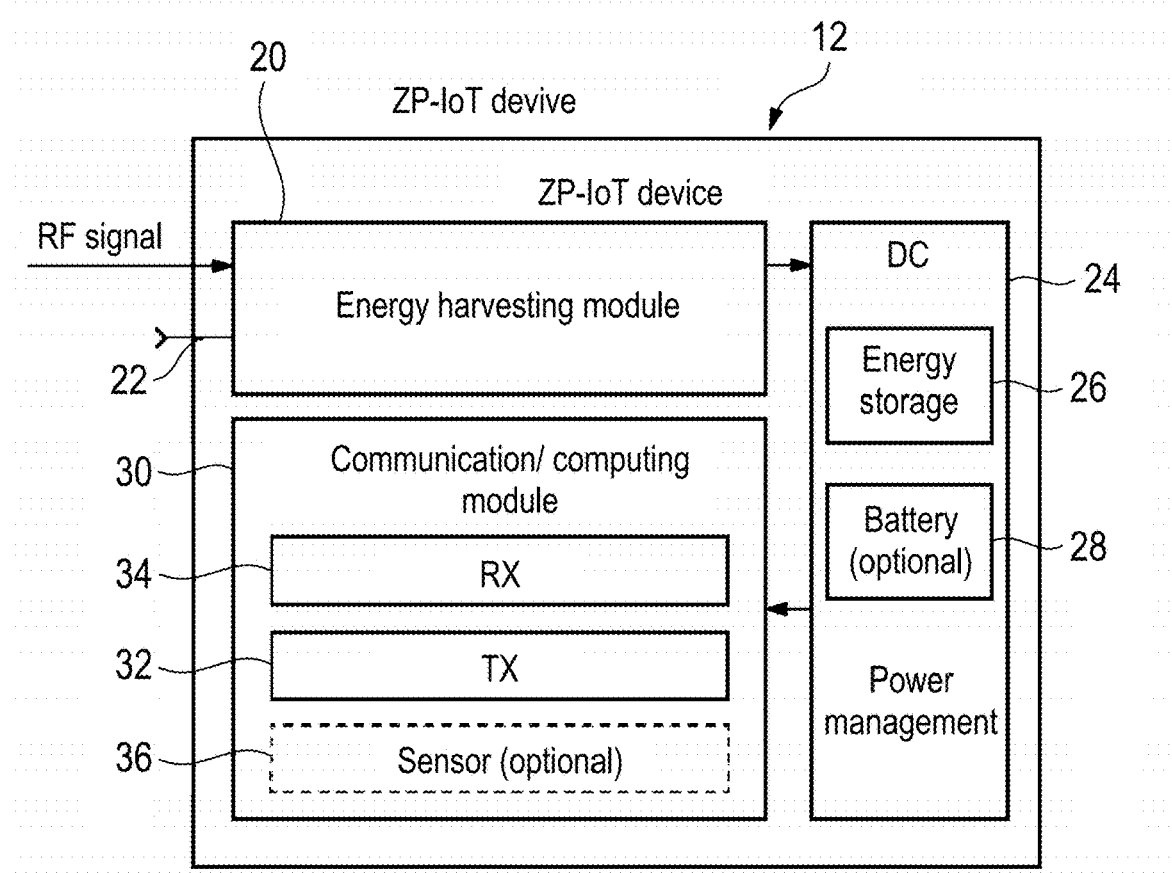

An example of the IoT device 12 is shown in more detail in FIG. 2. As shown in FIG. 2, the IoT device 12 comprises a charging module 20, also called energy harvesting module. The charging module 20 may be connected to a reception antenna 22 for receiving a signal, e.g. a radio frequency (RF) signal. The respective signal may be transmitted by the network device 18.

The RF signal may be a specific energy harvesting signal that is used for charging the IoT device 12. However, the RF signal may also relate to a synchronization signal that is processed by the IoT device 12 in order to synchronize the IoT device 12 with the network 14, for example the further IoT devices 16 and/or the network device 18. This will be explained later with reference to FIG. 3 in more detail.

The charging module 20 is connected with a storage circuit 24 that comprises an energy storage 26, e.g. a capacitor. In addition, an additional battery 28 may be provided as a further energy storage. Accordingly, two different kinds of energy storage may be provided. In an embodiment, the storage circuit 24 comprises a power management functionality that is used for managing the energy stored in the energy storage 26.

Generally, the charging module 20 includes circuitry configured to convert the energy harvesting signal to a direct current (DC) signal used for charging the energy storage 26. For instance, the charging module 20 comprises a rectifier circuit. The energy storage 26 is used to store the energy obtained from converting the energy harvesting signal.

In addition, the IoT device 12 comprises a communication module 30 that is connected with a transmission part 32 ("TX"), for instance a transmitter or a backscatter processor. The transmission part 32 ("TX") may be a transmission circuit. The communication module 30 may also be connected with a reception part 34 ("RX"). The reception part 34 may comprise radio frequency components and/or a baseband component. The reception part 34 ("RX") may be a reception circuit.

Generally, the transmission part 32 ("TX") and the reception part 34 ("RX") may be used for communication purposes of the IoT device 12.

The transmission part 32 ("TX") and the reception part 34 ("RX"), namely the respective circuits, may be inter alia used for synchronizing the IoT device 12 and/or (initially) accessing a cell, namely the network 14. The IoT device 12 however requires power/energy to be enabled to perform the respective processes. This is particularly important in case the IoT device 12 is in an idle mode such that the transmission part 32 ("TX") and/or the reception part 34 ("RX"), namely the respective circuits, require power for waking up in order to be enabled to perform the synchronization and/or accessing.

This can be ensured by the specific energy harvesting signal as will be explained hereinafter by reference to FIG. 3.

Furthermore, the IoT device 12 has an optional sensor 34 in the shown embodiment, which is connected with the communication module 30. The sensor 34 is configured to sense at least one environmental parameter of the IoT device 12, e.g. temperature and/or humidity.

In FIG. 3, an overview of a representative method of operating the IoT device 12 is illustrated. An energy harvesting signal, EHS, is transmitted over-the-air, OTA. The energy harvesting signal provides energy to be stored in the energy storage 26 of the IoT device 12.

As shown in FIG. 3, the energy harvesting signal is transmitted prior to a synchronization signal, SS, during which the IoT device 12 synchronizes with the network 14, e.g. the network device 18. The energy harvesting signal, EHS, provides enough energy to the IoT device 12 so as to enable the IoT device 12 to perform the synchronization, namely to receive and process the synchronization signal, SS.

Typically, the IoT device 12 is in its idle mode which means that the internal circuits are not activated, e.g. neither the transmission part/circuit 32 nor the receiving part/circuit 34. Hence, receiving and processing the synchronization signal, SS, in order to perform the synchronization would not be possible.

Accordingly, the energy harvesting signal, EHS, relates to a wake-up signal for the IoT device 12, for example the internal circuit(s) like the transmission part/circuit 32 and the receiving part/circuit 34.

For this purpose, a temporal gap is provided between the energy harvesting signal, EHS, and the synchronization signal, SS, which ensures that enough time is provided to activate the internal circuits of the IoT device 12, namely the transmission part/circuit 32 and the receiving part/circuit 34. In an embodiment, the entire communication module 30 may be woken up by the energy harvesting signal, EHS.

Therefore, it is ensured that the subsequent synchronization signal, SS, can be received and processed appropriately by the IoT device 12 in order to ensure proper synchronization, for example initial access to the network 14.

The synchronization signal, SS, that is transmitted after the energy harvesting signal, EHS, can be attached to the energy harvesting signal, EHS, which means that the synchronization signal, SS, follows the energy harvesting signal, EHS, in a defined manner, namely by the temporal gap. Hence, a linkage in time domain is provided.

As indicated above, the energy harvesting signal, EHS, ensures to forward energy to the IoT device 12 so that the IoT device 12 has enough energy for performing subsequent processes like synchronization and accessing the network 14 or generally a cell. Since the synchronization signal, SS, is attached to the energy harvesting signal, EHS, it is ensured that the energy forwarded is consumed for the synchronization and/or the (initial) access to the cell/network 14 rather than for other purposes.

FIG. 3 further shows that the energy harvesting signal, EHS, is repeated with a periodicity TE larger than a periodicity TS of the synchronization signal, SS. In the shown embodiment, the periodicity TS of the synchronization signal is illustrated for the specific case that the synchronization signal is transmitted only once.

Hence, the periodicity TE of the energy harvesting signal, EHS, is at least twice the periodicity TS of the synchronization signal, SS, as the periodicity TE of the energy harvesting signal, EHS, corresponds to 40 ms.

The energy harvesting signal, EHS, has a duration that ensures charging the IoT device 12 enough for performing the subsequent processes, namely synchronization and/or accessing the cell.

For reducing the duration, the energy harvesting signal, EHS, may be transmitted with a maximum power. Thus, the duration of the energy harvesting signal, EHS, can also be minimized while still ensuring to forward enough energy to the IoT device 12.

In an embodiment, the energy harvesting signal, EHS, used for providing energy to the IoT device 12, has specific energy harvesting signal characteristics that are optimized for energy harvesting. These characteristics comprise, for example, at least one of sequence, bandwidth and resource element, RE, mapping. In other words, the sequence, bandwidth and/or resource element mapping of the energy harvesting signal, EHS, is optimized with respect to energy harvesting.

For instance, the bandwidth of the energy harvesting signal, EHS, is larger than the one of the synchronization signal, SS, as also illustrated in FIG. 3. The energy harvesting signal, EHS, might occupy the whole (system) bandwidth to achieve high efficiency of energy conversing, whereas the synchronization signal, SS, or also other cellular reference signals only occupy part of the (system) bandwidth.

As also shown in FIG. 3, the duration tE of the energy harvesting signal, EHS, is larger than the duration tS of the synchronization signal, SS. The duration tE of the energy harvesting signal, EHS, may be between 1 ms and 5 ms, which is sufficient for providing the required energy to the IoT device 12. Hence, the energy harvesting signal, EHS, is enabled to provide more energy to the IoT device 12. Moreover, the energy harvesting signal, EHS, does not provide any data multiplexing in frequency domain and/or spatial domain, as the energy harvesting signal occupies all power in a OFDM symbol.

In an embodiment, the resource element mapping and/or the sequence is also different to other signals used, for example the synchronization signal, SS. The duration and/or periodicity of the energy harvesting signal might be larger than a synchronization signal block, SSB, signal or other signals, thereby enabling the burst of energy transmission Even though the synchronization signal, SS, is transmitted after the energy harvesting signal, EHS, the energy harvesting signal, EHS, may comprise at least one synchronization signal component so as to assist the subsequent synchronization at least partly.

Certain embodiments disclosed herein include systems, apparatus, modules, units, devices, components, etc., that utilize circuitry (e.g., one or more circuits) in order to implement standards, protocols, methodologies or technologies disclosed herein, operably couple two or more components, generate information, process information, analyze information, generate signals, encode/decode signals, convert signals, transmit and/or receive signals, control other devices, etc. Circuitry of any type can be used. It will be appreciated that the term "information" can be use synonymously with the term "signals" in this paragraph. It will be further appreciated that the terms "circuitry," "circuit," "one or more circuits," etc., can be used synonymously herein.

In an embodiment, circuitry includes, among other things, one or more computing devices such as a processor (e.g., a microprocessor), a central processing unit (CPU), a digital signal processor (DSP), an application-specific integrated circuit (ASIC), a field programmable gate array (FPGA), a system on a chip (SoC), or the like, or any combinations thereof, and can include discrete digital or analog circuit elements or electronics, or combinations thereof. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes an implementation comprising one or more processors or portions thereof and accompanying software, firmware, hardware, and the like.

For example, the functionality described herein can be implemented by special purpose hardware-based computer systems or circuits, etc., or combinations of special purpose hardware and computer instructions. Each of these special purpose hardware-based computer systems or circuits, etc., or combinations of special purpose hardware circuits and computer instructions form specifically configured circuits, machines, apparatus, devices, etc., capable of implementing the functionality described herein.

In an embodiment, one or more of the components, such as internet-of the things (IoT) device 12, the network 14, the IoT devices 16, the network device 18, etc., referenced above include circuitry programmed to carry out one or more steps of any of the methods disclosed herein. In an embodiments, one or more computer-readable media associated with or accessible by such circuitry contains computer readable instructions embodied thereon that, when executed by such circuitry, cause the component or circuitry to perform one or more steps of any of the methods disclosed herein.

In an embodiment, the computer readable instructions includes applications, programs, program modules, scripts, source code, program code, object code, byte code, compiled code, interpreted code, machine code, executable instructions, and/or the like (also referred to herein as executable instructions, instructions for execution, program code, computer program instructions, and/or similar terms used herein interchangeably).

In an embodiment, computer-readable media is any medium that stores computer readable instructions, or other information non-transitorily and is directly or indirectly accessible to a computing device, such as processor circuitry, etc., or other circuitry disclosed herein etc. In other words, a computer-readable medium is a non-transitory memory at which one or more computing devices can access instructions, codes, data, or other information. As a non-limiting example, a computer-readable medium may include a volatile random access memory (RAM), a persistent data store such as a hard disk drive or a solid-state drive, or a combination thereof. In an embodiment, memory can be integrated with a processor, separate from a processor, or external to a computing system.

Accordingly, blocks of the block diagrams and/or flowchart illustrations support various combinations for performing the specified functions, combinations of operations for performing the specified functions and program instructions for performing the specified functions. These computer program instructions may be loaded onto one or more computer or computing devices, such as special purpose computer(s) or computing device(s) or other programmable data processing apparatus(es) to produce a specifically-configured machine, such that the instructions which execute on one or more computer or computing devices or other programmable data processing apparatus implement the functions specified in the flowchart block or blocks and/or carry out the methods described herein. Again, it should also be understood that each block of the block diagrams and flowchart illustrations, and combinations of blocks in the block diagrams and/or flowchart illustrations, or portions thereof, could be implemented by special purpose hardware-based computer systems or circuits, etc., that perform the specified functions or operations, or combinations of special purpose hardware and computer instructions.

In the foregoing description, specific details are set forth to provide a thorough understanding of representative embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure.

Although the method and various embodiments thereof have been described as performing sequential steps, the claimed subject matter is not intended to be so limited. As nonlimiting examples, the described steps need not be performed in the described sequence and/or not all steps are required to perform the method. Moreover, embodiments are contemplated in which various steps are performed in parallel, in series, and/or a combination thereof. As such, one of ordinary skill will appreciate that such examples are within the scope of the claimed embodiments.

In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. In addition, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments. Thus, it will be appreciated that embodiments of the present disclosure may employ any combination of features described herein. All such combinations or sub-combinations of features are within the scope of the present disclosure.

Throughout this specification, terms of art may be used. These terms are to take on their ordinary meaning in the art from which they come, unless specifically defined herein or the context of their use would clearly suggest otherwise.

The drawings in the FIGURES are not to scale. Similar elements are generally denoted by similar references in the FIGURES. For the purposes of this disclosure, the same or similar elements may bear the same references. Furthermore, the presence of reference numbers or letters in the drawings cannot be considered limiting, even when such numbers or letters are indicated in the claims.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A method of operating an internet-of-things, IoT, device, the method comprising:
   providing an internet-of-things device with an energy storage, and
   transmitting an energy harvesting signal over-the-air, wherein the energy harvesting signal provides energy to be stored in the energy storage, and wherein the energy harvesting signal is transmitted prior to a synchronization signal which synchronizes the internet-of-things device.

2. The method according to claim 1, wherein a temporal gap is provided between the energy harvesting signal and the synchronization signal.

3. The method according to claim 1, wherein the synchronization signal is attached to the energy harvesting signal such that the synchronization signal follows the energy harvesting signal in a defined manner.

4. The method according to claim 1, wherein the energy harvesting signal is repeated with a periodicity larger than a periodicity of the synchronization signal.

5. The method according to claim 4, wherein the periodicity of the energy harvesting signal is at least twice the periodicity of the synchronization signal.

6. The method according to claim 1, wherein the energy harvesting signal is transmitted for a duration that ensures charging the internet-of-things device enough for at least enabling synchronization and/or accessing a cell via a random access procedure.

7. The method according to claim 1, wherein the energy harvesting signal is transmitted with maximum power.

8. The method according to claim 1, wherein the internet-of-things device is in an idle mode when receiving the energy harvesting signal.

9. An energy harvesting signal to be used by the method of operating an internet-of-things (IoT) device according to claim 1, wherein the energy harvesting signal comprises energy harvesting signal characteristics optimized for energy harvesting, wherein the energy harvesting signal characteristics comprise at least one of sequence, bandwidth and resource element mapping.

10. The energy harvesting signal according to claim 9, wherein the energy harvesting signal has a duration that ensures charging the internet-of-things device enough for at least enabling synchronization and/or accessing a cell via random access procedure.

11. The energy harvesting signal according to claim 10, wherein the duration is between 1 ms and 5 ms.

12. The energy harvesting signal according to claim 9, wherein the energy harvesting signal has different characteristics compared to a synchronization signal used for synchronizing the internet-of-things device.

13. The energy harvesting signal according to claim 9, wherein the energy harvesting signal has a periodicity larger than a synchronization signal used for synchronizing the internet-of-things device.

14. The energy harvesting signal according to claim 9, wherein the energy harvesting signal has a larger bandwidth than a synchronization signal used for synchronizing the internet-of-things device.

15. The energy harvesting signal according to claim 9, wherein the energy harvesting signal has a larger duration than a synchronization signal used for synchronizing the internet-of-things device.

16. The energy harvesting signal according to claim 9, wherein no data multiplexing in frequency domain and/or spatial domain is provided.

17. The energy harvesting signal according to claim 9, wherein the energy harvesting signal comprises at least one synchronization signal component.

18. An internet-of-things (IoT) device, comprising:
   circuitry configured to receive an energy harvesting signal, the energy harvesting signal comprising energy harvesting signal characteristics optimized for energy harvesting, wherein the energy harvesting signal characteristics comprise at least one of sequence, bandwidth and resource element mapping, whereupon reception of the energy harvesting signal, the circuitry is further configured to enable the IoT device to receive and process a subsequent synchronization signal (SS).

19. The internet-of-things (IoT) device according to claim 18, wherein the energy harvesting signal has a duration that ensures charging the internet-of-things device a suitable amount for at least enabling synchronization and/or accessing a cell via random access procedure.

20. An apparatus, comprising:
   circuitry configured to generate and transmit an energy harvesting signal, the energy harvesting signal comprising energy harvesting signal characteristics optimized for energy harvesting, wherein the energy harvesting signal characteristics comprise at least one of sequence, bandwidth and resource element mapping.

* * * * *